Sept. 7, 1926.
H. L. JOHNSON
SIEVE STRUCTURE
Filed Oct. 11, 1923
1,598,913
2 Sheets-Sheet 1
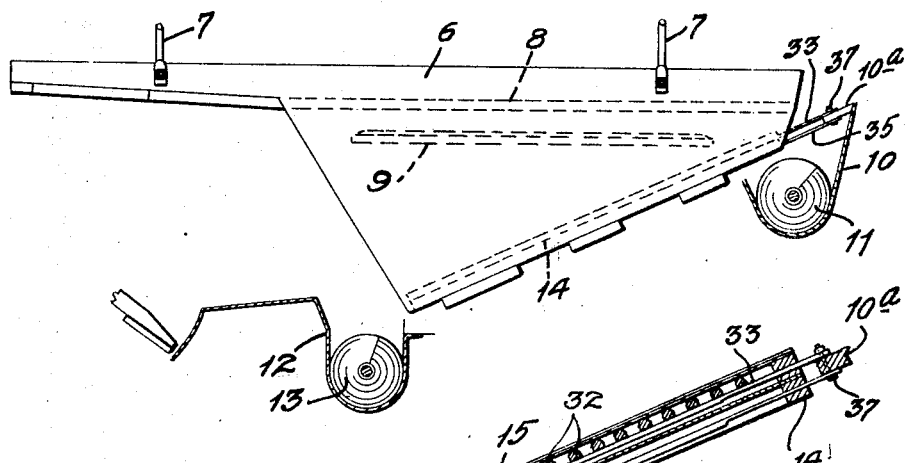
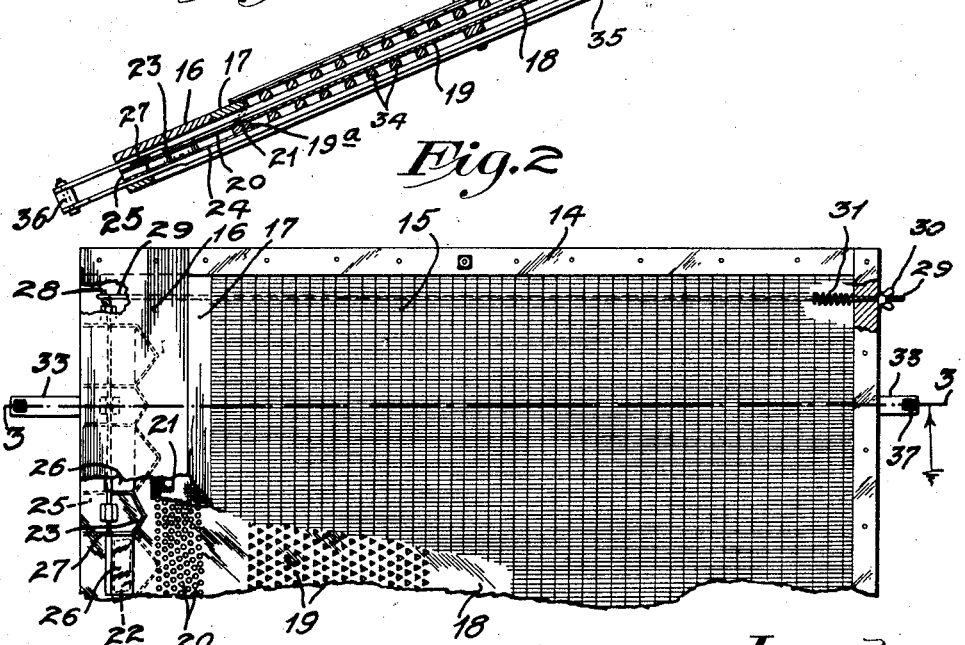
Inventor
Harry L. Johnson
By his Attorneys Sept. 7, 1926.

H. L. JOHNSON

SIEVE STRUCTURE

Filed Oct. 11, 1923

Inventor
Harry L. Johnson
By his Attorneys

Patented Sept. 7, 1926.

1,598,913

UNITED STATES PATENT OFFICE.

HARRY L. JOHNSON, OF PENN, NORTH DAKOTA, ASSIGNOR, BY MESNE ASSIGNMENTS, OF ONE-HALF TO ANDRINE M. SORENSEN, OF ST. PAUL, MINNESOTA.

SIEVE STRUCTURE.

Application filed October 11, 1923. Serial No. 667,844.

My invention provides an improved sieve structure and, generally stated, it consists of the novel devices and combination of devices hereinafter described and defined in the claims.

This sieve structure is particularly designed for the separation of wheat from wild oats, pin oats, and small seeds, but is capable of more general use for the separation of relatively long and thin objects from relatively short and thick objects.

Hitherto, in sieve structures designed for the separation of wheat from oats, it has been the established practice to provide an upper sieve through which the wheat would pass and over which the oats would slide to the delivery end thereof, but in my improved sieve structure, I provide an upper sieve through which the oats will pass but over which the wheat will slide to the delivery end thereof. This arrangement, combined with other novel features hereinafter disclosed, I have found, in practice, provides a much more efficient arrangement for the separation from wheat of wild oats, pin oats, and the like.

This improved sieve structure may be applied in a threshing machine in a fanning mill or elsewhere, but particularly in stationary machines for the separation of wheat from oats. In a threshing machine, the improved sieve structure would be arranged to receive from scalping sieves by which straw, chaff and all objects larger than wheat and oats will be removed from the main body of straw, consisting of wheat, oats and more or less small seeds, such as mustard seeds and the like. When the sieve structure is used elsewhere than in a threshing machine, said larger foreign particles will be removed by a suitable scalping sieve, which acts on the commingled stock before it is delivered to my improved sieve structure.

In the accompanying drawings, which illustrate the invention, like characters indicate like parts throughout the several views.

Referring to the drawings:—

Fig. 1 is a fragmentary view in side elevation, with some parts sectioned, showing the position of my improved sieve structure when applied in a threshing machine;

Fig. 2 is a plan view of the improved sieve structure, with some parts broken away and some parts sectioned;

Fig. 3 is a vertical section taken on the line 3—3 of Fig. 2;

Figure 4:
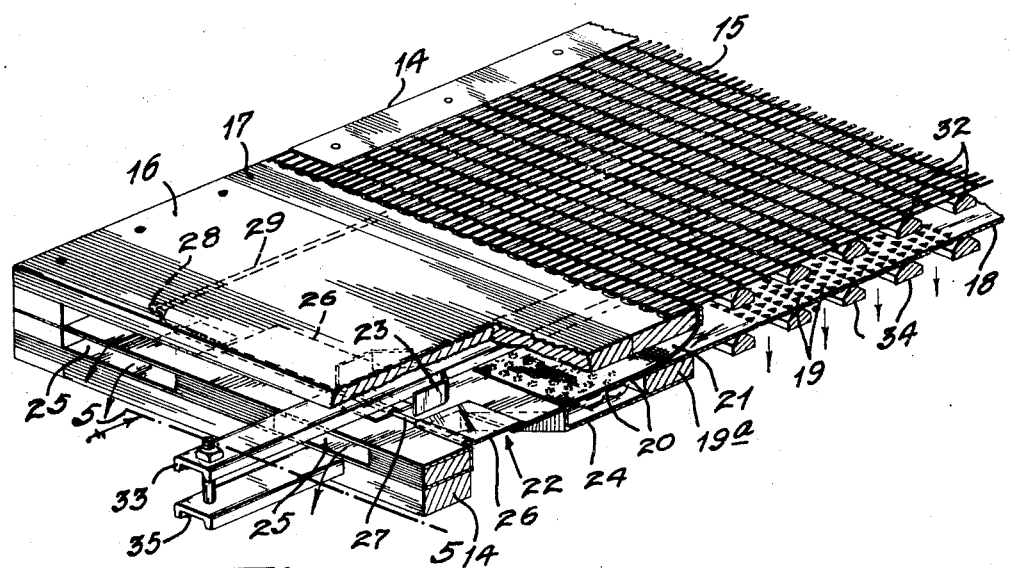
Fig. 4 is a perspective view, with some parts sectioned and some parts broken away, showing the improved sieve structure.
Figure 5:
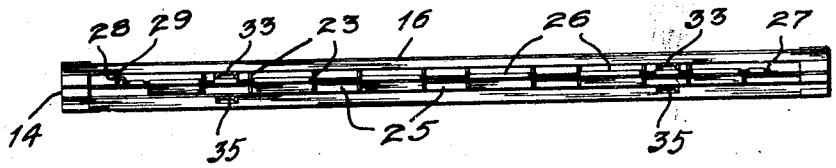
Fig. 5 is a front elevation of the sieve structure, with some parts sectioned on the line 5—5 of Fig. 4.

Of the parts of the threshing machine shown in Fig. 1, the numeral 6 indicates a sieve shoe, as shown mounted for longitudinal vibratory movements on the usual hanger rods 7. This shoe, in its upper portion, carries the ordinary scalping sieve 8 indicated by dotted lines only in Fig. 1. The numeral 9 indicates a deck that underlies the scalping sieve 8 and delivers the wheat, oats and commingled small seeds, which are passed through the scalping sieve 8, onto the upper or receiving portion of the improved sieve structure.

The numeral 10 indicates a fixed transverse trough that receives from the scalping sieve 8 and in which, as shown, is a spiral conveyor 11. The numeral 12 indicates a fixed transverse trough in which, as shown, is a spiral conveyor 13. This trough 12, as will hereinafter be noted, is in position to receive the clean wheat from the improved sieve structure.

The improved sieve structure, as preferably designed, has a rectangular marginal frame 14, usually of wood. On the upper portion of this frame 14 is supported an upper sieve 15, which has narrow elongated meshes and which is preferably a woven wire screen. The meshes of the screen 15 are so narrow that wheat will not pass therethrough, but are wide enough and long enough to pass wild oats, pin oats, and, of course, small seeds. At its lower end, in line with the sieve 15, the frame 14 has an inclined imperforate deck 16 that extends to the extreme lower end of said frame 14. The front edge of the deck 16 is aligned with a flat transverse bar 17, the ends of which are secured to the frame 14. The lower or delivery end of the sieve 15 is nailed or otherwise secured directly on said transverse bar 17.

Parallel with and directly below the upper sieve 15 is a lower sieve 18, preferably of the zinc plate type, and which is secured to the sides and upper transverse portion of the frame 14 and to a lower transverse bar 19ª, the ends of which latter are secured to the sides of the frame 14. The upper portion of this sieve plate 18 is preferably imperforate, but underlying a considerable part of the lower portion of said sieve 15, said plate 18 is formed with small perforations 19. These perforations 19 are large enough to pass therethrough small seeds, but are not of a size or form to pass the oats therethrough. I have obtained the best results by making the perforations 19 triangular, with the apexes of the triangles pointing upward, so that small seeds will not be wedged and caught therein. The sieve plate 18 is extended downward or forward below the bar 17 and below a portion of the deck 16 and is provided with perforations 20, preferably round, and of such size that wheat will readily pass therethrough, but the relatively long oats, if held flat on the plate, will slide over said perforations. To hold the oats flat on the sieve plate, so that they will pass over and not through the perforations 20, I provide a flexible flap or rider 21, the upper edge of which is attached to the bar 17.

This flexible flap completely covers the perforations 20 and the said plate 18 has an imperforate portion that extends a considerable distance below said perforations and is formed with discharge ports 22. Extended vertically between this imperforate portion of the plate 18 and the overlying deck 16 and located between the ports 22 are pointed deflectors 23 that cause all of the stock moving on the lower imperforate portion of the plate 18 to drop through the ports 22.

Underlying the perforations 20 and secured to the bar 19ª and the plate 18, is a transverse trough-like pan 24, preferably of sheet metal, that is formed with contracted discharge passages 25 extended below the imperforate lower portion of the plate 18 and, as shown, underlying the deflectors 23 so that they are extended between the ports 22.

For closing the ports 22 at certain times, I provide hinged gates or valve plates 26 shown as secured to a common rock shaft 27 journaled in suitable bearings on the lower portion of the plate 18 and provided at one end with a small crank 28 to which the front end of an operating rod 29 is connected. This rod 29 extends through a perforation in the rear transverse portion of the sieve frame 14, is provided with an adjusting nut 30, and is forwardly pressed by a small coiled spring 31.

The improved sieve structure just described, when applied to the shoe 6 of the threshing machine, may be nailed, clamped or otherwise secured on the inclined bottom of the shoe 6 in such position that material delivered off from the lower end of the deck 16 or from the lower extremities of the passages 25 will drop into the trough 12, but material delivered through the ports 22 will drop outside of the trough 12 and at the right-hand side thereof, as viewed in Fig. 1.

As an additional important feature, I provide a sieve-cleaning device which, in addition to its ordinary cleaning function, serves other important purposes.

Working against the undersurface of the upper sieve 15 is a sieve-cleaning device made up of transverse wooden slats 32 and a pair of laterally spaced metal bars 33, to which said slats are secured. The bars 33, at their upper ends, are shown as anchored to the top flange 10ª of the fixed upper trough 10, so that said cleaning device will remain stationary when the sieve structure is reciprocated. Working against the undersurface of that portion of the sleeve plate 18 that has the perforations 20 therein is a similar but shorter cleaning device made up of cross slats 34 and metal bars 35 to which said slats are secured. The bars 33 and 35 are thus arranged in parallel upper and lower pairs shown as connected at their lower ends by a spacing block or bar 36. The bars 35, at their upper ends, are secured to the flange or fixed element 10ª by nut-equipped bolts 37, which also serve to anchor the upper ends of the bars 33. The bars 33 and 35, both at their upper and lower ends, work through suitable guide passages formed in the transverse end portions of the sieve frame 14.

*Operation.*

Usually, the valve-acting plates 26 will be raised so as to open the ports 22, and this may be readily accomplished by adjusting the nut 30 on the rod 29. As already indicated, the straw, chaff and large particles will be carried from the commingled stock by the upper sieve or scalping screen 8 and will be delivered into the upper trough 10. Hence, the stock delivered to the upper portion of the upper sieve may be assumed to consist chiefly of wheat, but in part of wild oats, pin oats, possibly some tame oats, and small seeds, such as mustard seeds and the like. Under vibration of the upper sieve, the stock will be worked downward over the same and all of the small seeds and the oats will be worked through the narrow elongated meshes of said sieve, but the main body of the wheat will be carried onward over the said sieve and delivered off from the lower end of the deck 16.

The oats and small seeds passing through the meshes of the sieve 15 will drop onto the upper portion of the sieve plate 18 and, as this stock passes over the perforations 19, the small seeds will drop through the said sieve to the ground or to some suitable receptacle, if such be provided, but the oats will not pass through these perforations 19. Some of the smaller or shriveled or broken wheat kernels will pass with the oats through the meshes of the sieve 15 and these will not pass through the perforations 19, but with the oats will be worked downward, and as they pass over the lower perforated portion of the sieve 18, will drop through the round portions 20, while the oats, being held flat and against endwise jumping actions by the flexible flap 21, will slide over said perforations 20 and will fall through the open ports 22. The wheat that passes downward through the perforations 20 will drop into the pan 24 and will be discharged outward through the transversely spaced passages 25. Usually, the smaller wheat discharged through the passages 25 will be recommingled with the good wheat, but when desired, the separation can be maintained simply by the provision of suitable receiving decks or receptacles, not shown.

The slats 32 of the upper sieve-cleaning device not only serve to keep the upper sieve 15 clean, but they will serve to dislodge and force upward any kernels of wheat that may be caught in the meshes of the sieve and have worked their way partway through the same. Except for this action, many of the wheat kernels might gradually work their way through the meshes of the upper sieve.

For some uses, it will be desirable to close the ports 22. For example, in the separation of small seeds from the main body of oats, the valve-acting plates 26 should be lowered to close said ports 22. In this use of the sieve structure, when the main body consists of oats, considerable of the oats will pass over the sieve 15 onto the deck 16 and thence off from the latter, but all of the small seeds and much of the oats will pass through said sieve 15 and onto the sieve plate 18, and in passing over said plate, the small seeds will drop through the perforations 19 while the oats will slide on downward over the perforations 20 over the lower valve plates 26 and off from the lower end of the plate 18, where they will be again commingled with the main body of oats.

What I claim is:—

1. A sieve structure comprising an upper sieve having relatively long and narrow passages adapted to pass oats but not wheat therethrough, and an imperforate deck below the same, a lower sieve provided below said upper sieve with passages adapted to pass small seeds therethrough, said lower sieve having below said imperforate deck relatively short and wide perforations adapted to pass wheat therethrough, a flexible flap resting on the lower sieve member and overlying said wheat passages in the lower portion thereof, and a trough-like catch pan underlying said wheat passages in the lower sieve member.

2. A sieve structure comprising an upper sieve having relatively long and narrow passages adapted to pass oats but not wheat therethrough, and an imperforate deck below the same, a lower sieve provided below said upper sieve with passages adapted to pass small seeds therethrough, said lower sieve having below said imperforate deck relatively short and wide perforations adapted to pass wheat therethrough, a flexible flap resting on the lower sieve member and overlying said wheat passages in the lower portion thereof, and a trough-like catch pan underlying the wheat passage in the lower sieve member, said lower sieve member having large discharge ports below said catch pan.

3. A sieve structure comprising an upper sieve having relatively long and narrow passages adapted to pass oats but not wheat therethrough, and an imperforate deck below the same, a lower sieve provided below said upper sieve with passages adapted to pass small seeds therethrough, said lower sieve having below said imperforate deck relatively short and wide perforations adapted to pass wheat therethrough, a flexible flap resting on the lower sieve member and overlying said wheat passages in the lower portion thereof, and a trough-like catch pan underlying the wheat passages in the lower sieve member, said lower sieve member having large discharge ports below said pan, said discharge ports being transversely spaced and the lower sieve member having thereon upstanding deflectors located between said ports for directing the material therethrough.

4. A sieve structure comprising a marginal frame, upper and lower sieve members connected to said frame, said upper sieve member having narrow elongated oat passages and below the same an imperforate deck, said lower sieve member having small seed passages below the elongated meshes of said upper sieve member and below said deck having substantially round wheat passages and oat-discharge passages, and a flexible flap riding on the lower sieve member above the wheat passages thereof.

In testimony whereof I affix my signature.

HARRY L. JOHNSON.